United States Patent [19]

Tsukada

[11] Patent Number: 5,492,413
[45] Date of Patent: Feb. 20, 1996

[54] SEALING DEVICE FOR A LINEAR GUIDE

[75] Inventor: Toru Tsukada, Gunma, Japan

[73] Assignee: NSK Ltd., Tokyo, Japan

[21] Appl. No.: 277,166

[22] Filed: Jul. 19, 1994

[30] Foreign Application Priority Data

Jul. 22, 1993 [JP] Japan .................... 5-181385

[51] Int. Cl.⁶ ........................................ F16C 29/06
[52] U.S. Cl. ............................................... 384/15
[58] Field of Search .................. 384/13, 15, 43, 384/44, 45

[56] References Cited

U.S. PATENT DOCUMENTS

| | | | |
|---|---|---|---|
| 2,951,728 | 9/1960 | Drake | 384/15 |
| 4,491,373 | 1/1985 | Sugi et al. | 384/13 |
| 5,149,205 | 9/1992 | Tsukada | 384/15 |
| 5,186,544 | 2/1993 | Eder et al. | 384/15 |
| 5,399,023 | 3/1995 | Winkelmann et al. | 384/15 X |

*Primary Examiner*—Thomas R. Hannon
*Attorney, Agent, or Firm*—Sughrue, Mion, Zinn, Macpeak & Seas

[57] ABSTRACT

A sealing device for a linear guide providing a guide rail and a slider, which is mounted on each of both ends of the slider so as to sealingly close the gaps between the inner surface of the slider and the outer surface of the guide rail, provides a first layer of rubber or synthetic resin and a second layer of lubricant-contained rubber of synthetic resin which are at least partially laid on and bonded to each other, so that the lubricant is kept supplied from the second layer to the surfaces with which the sealing device is sealingly in contact.

9 Claims, 4 Drawing Sheets

SEALING DEVICE FOR A LINEAR GUIDE

BACKGROUND OF THE INVENTION

The present invention relates to an improvement of a sealing device for a linear guide which is used with machine tools, industrial machines, measuring apparatuses, and so forth.

A linear guide as shown in FIG. 6 is used generally. The linear guide provides: a guide rail 1 extended axially; and a slider 2 substantially U-shaped in section which is movably mounted over the guide rail 1. Two ball rolling grooves 3 are formed in each of the two side surfaces of the guide rail 1. The body 2A of the slider 2 (hereinafter referred to as "a slider body 2A", when applicable) has a pair of right and left wings, the inner surfaces of which have ball rolling grooves (not shown) which are confronted with the ball rolling grooves 3 of the guide rail 1, respectively. A number of rolling elements, namely, balls are rollingly provided in the spaces defined by those guide rails, so that the slider 2 is axially moved along the guide rail 1 through the rolling of the balls. Ball returning paths (not shown) are formed in the right and left wings of the slider body 2A in such a manner that they are axially extended through those wings. Two end caps 2B substantially U-shaped in section are attached to both end faces of the slider body 2, respectively. Each of the end caps 2B has curved paths (not shown) through which the above-described ball returning paths are communicated with said ball rolling grooves 3. That is, the curved paths, the ball returning paths, and the ball rolling grooves form endless ball circulating paths.

As the slider 2 moves along the guide rail 1, the balls between the guide rail 1 and the slider 2 advance in the ball rolling grooves to the one end portion of the slider body 2A, where they make U-turn being guided into the curved paths. Thereafter, the balls are moved through the ball returning paths to the other end portion of the slider body, where they make U-turn again being guided into the curved paths, thus returning into the ball rolling grooves. The above-described ball circulating operation is repeatedly carried out.

In FIG. 6, reference character denotes a grease nipple through which lubricant is supplied to the ball circulating paths in the slider 2.

If foreign matters such as dust and chips enter the gap between the guide rail 1 and the slider 2 slidably mounted over the former 1 and stick, for instance, to the ball rolling grooves, then they may obstruct the smooth rolling of the balls. In order to eliminate this difficulty, a pair of side seals 10 as shown in FIG. 7 are attached to the outer surfaces of the end caps 2B.

Each of the side seals 10 is formed by welding a seal member S of nitrile rubber or urethane rubber onto a reinforcing steel plate U-shaped in section. The side seals 10 are fastened to the end caps 2B at the front and rear ends of the slider 2 with bolts in such a manner that they are slidably in contact with the outer surface of the guide rail 1 to prevent the entrance of foreign matters into the slider 2 in front and in rear.

The above-described conventional sealing device for a linear guide is still disadvantageous in the following points:

(1) The sealing device formed by welding a sheet of nitrile rubber or urethane rubber to a steel plate is not self-lubricating. Therefore, the sealing device is allowed to slide smoothly by decreasing the friction between the sealing device and the guide rail with lubrication applied thereto from outside. Hence, in the case where the linear guide is used in the circumstance that foreign matter such as wooden pieces and casting chips sprinkle over it, that foreign matters, sticking to the sealing device, absorbs the lubricant, as a result of which the sealing device is quickly worn out, and at worst is broken.

(2) In the case where the linear guide is used in a clean room, in order to reduce the amount of dust produced while the linear guide is being used, a difficult and costly operation of applying a minimum quantity of lubricant required for rolling the balls to the ball circulating paths in the linear guide with an injector or a special injecting unit must be carried out.

(3) Furthermore, in the case where the linear guide is used in a clean room, the service life of the linear guide is ended when the minimum quantity of lubricant which has been injected thereinto during the assembling of the linear guide is used up.

(4) In addition, in the case where the linear guide is used in a clean room, in spite of the fact that the amount of lubrication supplied is small, the lubricant holding space is relatively large. Therefore, the lubricant thus supplied is not sufficiently applied to the ball circulating paths; that is, it is not effectively utilized.

SUMMARY OF THE INVENTION

In view of the foregoing, an object of the present invention is to provide a sealing device for a linear guide, to which, even in the case where the linear guide is used in the circumstance that foreign matter such as wooden pieces and casting chips sprinkle over it, and even under the condition that the quantity of lubricant to be supplied is limited to an extremely small value as in the case where the linear guide is used in the clean room, the lubricant is uniformly supplied for a long period, thus giving the linear guide a smooth operation and a long service life.

The foregoing object and other objects of the present invention have been achieved by the provision of a sealing device for a linear guide providing a guide rail and a slider which is linearly moved being guided by the guide rail, which is mounted on each of the two ends of the slider so as to sealingly close the gaps between the inner surface of the slider and the outer surface of the guide rail, which provides a layer of rubber or synthetic resin, and a layer of lubricant-contained rubber of synthetic resin which are at least partially laid on and bonded to each other, a seal lip provided for the layer of lubricant-contained rubber or synthetic resin being in contact with the outer surface of the guide rail to sealingly close the gaps between the inner surface of the slider and the outer surface of the guide rail.

The sealing device, being made up of the layer of lubricant-contained rubber or synthetic resin, is self-lubricating. That is, the lubricant is automatically supplied to the sliding surface oozing gradually from the sealing device. Hence, even if the linear guide is used in the circumstance that foreign matter such as wooden pieces and casting chips sprinkle over it, it is sufficiently lubricated at all times, and it is smoothly operated with less wear for a long period.

By varying the number of layers of rubber or synthetic resin and the number of layers of lubricant-contained rubber or synthetic resin and the thickness of them, the strength of the seal lip portion can be freely determined according to the purpose of use of the linear guide.

Furthermore, in the case where the sealing device is formed in such a manner that the layer of lubricant-contained rubber or synthetic resin is covered with the layer of ordinary rubber or synthetic resin, the lubricant never makes dirty the operator's hands and others.

The lubrication of the linear guide is achieved merely by attaching the sealing devices of the present invention to the slider. This eliminates the difficult, troublesome operation of applying a minimum quantity of lubricant required for rolling the balls to the ball circulating paths in the linear guide with an injector or a special injecting unit.

A sufficient quantity of lubricant can be contained in the sealing device in advance. A necessary amount of lubricant is kept supplied to the ball rolling grooves in the linear guide oozing gradually from the layer of lubricant-contained rubber or synthetic resin. Hence, the lubricant is all effectively utilized. Thus, the linear guide with the sealing device according to the present invention is much longer in service life than the conventional one with the lubricant sealed in the slider when assembled. Hence, even in the circumstance that, once the linear guide is installed, it is impossible to supplement the lubricant in it, the linear guide with the sealing devices according to the present invention requires no maintenance for a long time.

BRIEF DESCRIPTION OF THE DRAWING(S)

DETAILED DESCRIPTION OF THE PREFERRED EMBODIMENTS

Preferred embodiments of the present invention will be described with reference to the accompanying drawings.

Figure 1:
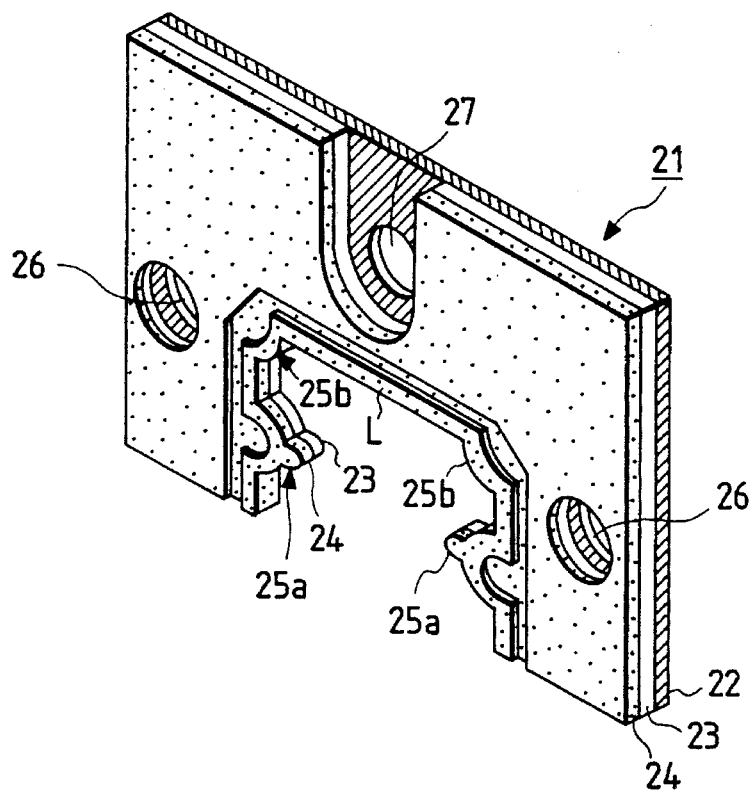
FIG. 1 is a perspective view showing an example of a sealing device for a linear guide, which constitutes a first embodiment of the present invention.

A sealing device for a linear guide, which constitutes a first embodiment of the present invention, is as shown in FIG. 1.

The sealing device, namely, a side seal 21 is unitedly formed as follows: First, a side seal reinforcing plate 22 is prepared which is a substantially U-shaped thin steel plate similar in configuration to the end cap of the linear guide. Thereafter, a layer of rubber or synthetic resin, namely, a seal member 23 is fixedly stuck onto the outer surface of the side seal reinforcing plate 22 by bonding or baking. Further, a layer of lubricant-contained rubber or synthetic resin, namely, a seal member 24 is fixedly stuck onto the upper surface of the seal member 23 by bonding or baking. Each of the seal members 23 and 24 is substantially U-shaped, having a recess with a U-shaped peripheral edge which is extended inwardly over the U-shaped peripheral edge of the side seal reinforcing plate 22. More specifically, each of the seal members 23 and 24 has a pair of right and left legs, and the aforementioned recess between them. A seal lip L is formed along the U-shaped peripheral edge of the recess without being stuck onto the outer surface of the side seal reinforcing plate 22, so that the seal lip L contacts slidingly the outer surface of the guide rail 1. Groove sliding protrusions 25a and 25b are extended inwardly toward the outer surface of the guide rail 1 from each of the right and left legs which edges. The protrusions 25a and 25b are made similar in configuration of the two ball rolling grooves 3 which are formed in each of the two side surfaces of the guide rail 1, so that they are held in slide contact with the ball rolling grooves 3. A plurality of mounting holes 26 for securing the side seal 21 to the end cap, and one grease nip mounting hole 27 are formed in the side seal 21.

The side seal thus formed functions as follows:

The side seals 21 are fixedly secured to the end caps at the front and rear ends of the slider by engaging screws through the mounting holes 26 with threaded holes formed in the end caps. The seal lips L of the side seal 21 are abutted against the side surfaces of the guide rail, the surfaces of the ball rolling grooves, and the upper surface of the guide rail.

The side seals 21 thus secured sealingly close the gaps between the guide rail and the front and rear end faces of the slider, thus completely preventing the entrance of foreign matters such as dust into the slider both in front and in rear.

The lubricant oozes gradually from the seal member 24 of lubricant-contained rubber or synthetic resin of the side seal 21, thus being automatically supplied to the friction surfaces of the seal lips L. Owing to this self-lubricating function, the seal slide surfaces, namely, the seal lips L are scarcely worn, allowing the linear guide to operate smoothly for a long period.

According to the present invention, the linear guide with the side seals may be used in the circumstance that foreign matter such as wooden pieces and casting chips which are liable to absorb the lubricant sprinkle over it. In this case, the lubricant may be partially absorbed by the foreign matter; however, the linear guide is maintained satisfactorily lubricated because the lubricant is supplied from the seal member 24 of lubricant-contained rubber or synthetic resin at all times.

The above-described effect due to the self-lubricating characteristic of the seal member 24 of lubricant-contained rubber or synthetic resin may be obtained in the case, too, where the seal member 23 of rubber or synthetic resin is not used; that is, in the case where only the seal member 24 is fixedly stuck directly onto the side seal reinforcing plate 22. However, it is rather difficult to fixedly stick the seal member 24 of lubricant-contained rubber or synthetic resin onto the side seal reinforcing plate 22 of steel plate by bonding or by baking; and even if the seal member 24 were bonded to the side seal reinforcing plate 22, it would be liable to peel off the side seal reinforcing plate 22. This difficulty can be eliminated by interposing the first seal member 23 between the side seal reinforcing plate 22 and the second seal member 24, because the seal member 23 can be readily stuck onto the side seal reinforcing plate 22, and the second seal member 24 of lubricant-contained rubber or synthetic resin can be fixedly stuck onto the first seal member 23 with ease.

In the first embodiment, the seal member 24 of lubricant-contained rubber or synthetic resin is substantially equal in size to the end cap on which the side seal 21 is to be mounted, and therefore it is able to contain a sufficient amount of lubricant in advance. The lubricant is supplied to the linear guide oozing gradually from the seal lip L which is in contact with the guide rail of the linear guide. This means that all the lubricant can be effectively used. On the other hand, in the conventional linear guide, the lubricant is sealed in the slider when it is assembled; however, it is difficult to effectively use all the lubricant, and therefore it is often required to supplement the lubricant during the operation. Hence, the linear guide with the side seals 21 according to the present invention is several times as long in service life as the conventional linear guide. Even in the circumstance that, once the linear guide is installed, it is impossible to supplement the lubricant in it, the linear guide according to the present invention requires no maintenance for a long period.

In the linear guide using the side seals 21, the grease nipple may be clogged up with a blind plug. In this case, the grease nipple may be opened to supply the lubricant such as grease into the slider.

Figure 2:
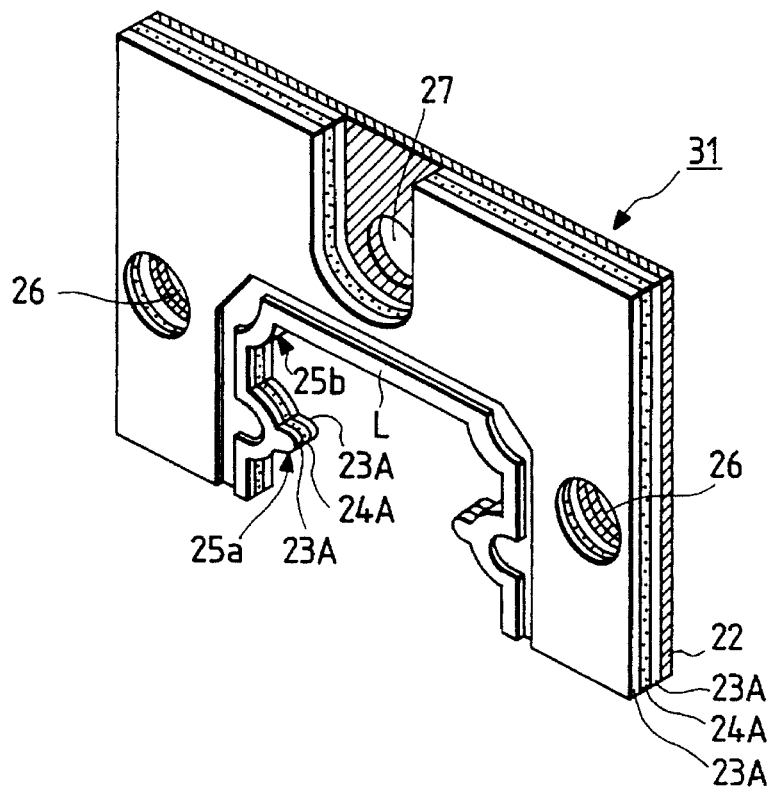
FIG. 2 is a perspective view showing another example of the sealing device, which constitutes a second embodiment of the present invention.

Another example of the side seal, which constitutes a second embodiment of the present invention, is as shown in FIG. 2.

The second embodiment, namely, a side seal 31 is different from the above-described first embodiment, namely, the side seal 21 in that a three-layer structure formed by holding a seal member 24A of lubricant-contained rubber or synthetic resin between two seal members 23A of non-porous rubber or synthetic resin is fixedly stuck onto a side seal reinforcing plate 22.

In the side seal 31, the lubricant contained in the seal member 24A is substantially not exposed to the air. Hence, in addition to the effects which are substantially equal to those provided by the first embodiment, the second embodiment has the following effects: The lubricant is substantially free from deterioration by oxidation, with the result that the linear guide is kept lubricated for a long period, and is lengthened in service life as much.

In the conventional linear guide, in order to prevent the lubricant from deterioration by oxidation, an oxidation inhibitor is added to the lubricant. However, the oxidation inhibitor is liable to impair the lubrication. On the other hand, as described above, in the side seal 31 of the present invention, the seal member 24A of lubricant-contained rubber of synthetic resin is held between the two seal members 23A of non-porous rubber of synthetic resin; that is, the seal member 24A is scarcely exposed to the air. Hence, the lubricant is prevented from deterioration by oxidation, and the linear guide is increased in service life as much.

Furthermore, the second embodiment has the following advantages: In mounting the side seal 31 on the slider, the lubricant contained in the seal member 24A does not make dirty the operator's hands, and others. In addition, dust scarcely sticks onto the surface of the side seal 31.

Figure 3:
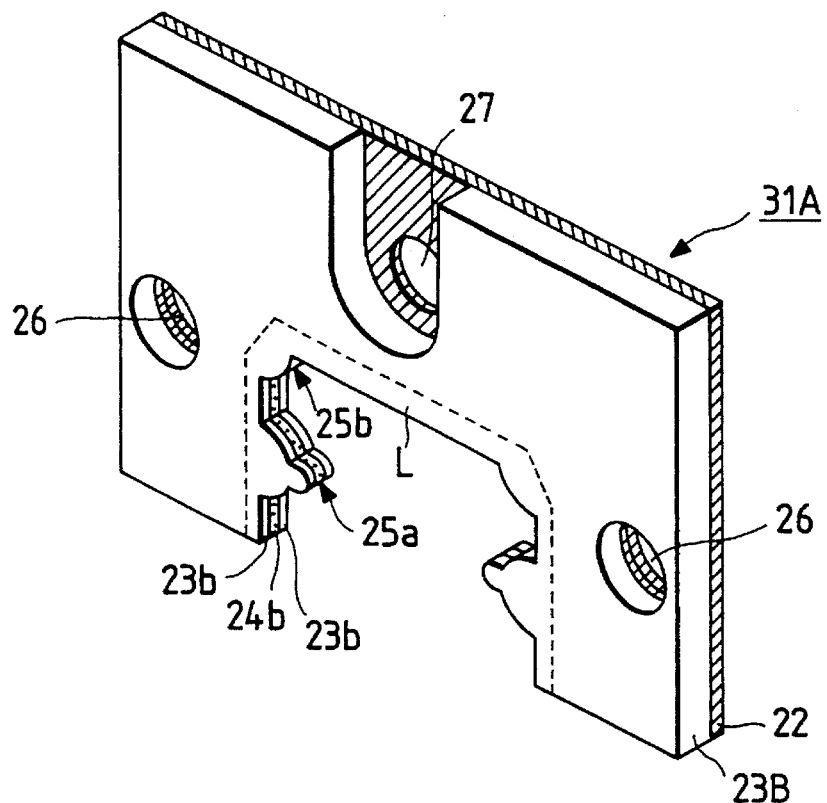
FIG. 3 is a perspective view showing one modification of the sealing device shown in FIG. 2.

FIG. 3 shows one modification of the side seal 31 according to the second embodiment of the present invention.

The modification, namely, a side seal 31A is designed as follows: The side seal 31A provides: the aforementioned side seal reinforcing plate 22, and a seal member 23B which is larger in wall thickness than the side seal reinforcing plate 22 and which is formed of rubber of synthetic resin. In particular, the side seal 31A is different from the side seal 31 of the second embodiment in which only a portion serving as a seal lip L (indicated by a broken line in FIG. 3) corresponding to the U-shaped peripheral edge of the recess of the seal member 23B has the above-described three-layer structure including seal members 23b and 24b. The seal member 23B thus formed is fixedly stuck onto the side seal reinforcing plate 22, to form the side seal 31A. In the modification, the three-layer structure is formed as follows: That is, a groove U-shaped in section (hereinafter referred to as "a U-shaped groove", when applicable) is formed only in the U-shaped peripheral wall, corresponding to the seal lip L, of the recess of the seal member 23B along the central line of the U-shaped peripheral wall, so that both the seal members 23b are formed. And the seal member 24b of lubricant-contained rubber of synthetic resin is inserted into the U-shaped groove thus formed. The three-layer structure thus formed is equivalent in function to that of the side seal 31 which is formed by holding the seal member 24A of lubricant-contained rubber or synthetic resin between two seal members 23A of non-porous rubber of synthetic resin.

The second embodiment and its modification are applicable to a linear guide which is used under the conditions that the lubricant can be supplemented with ease, and it is unnecessary for the side seals to contain a large amount of lubricant in advance, or a linear guide which is used for accurate measuring instruments.

In the above-described first embodiment, the two-layer structure, which is formed by sticking one seal member of rubber or synthetic on one seal member of lubricant-contained rubber or synthetic resin, is fixedly stuck onto the side seal reinforcing plate; and in the second embodiment, the three-layer structure which is formed by holding one seal member of lubricant-contained rubber or synthetic resin between two seal members of rubber or synthetic resin. However, the present invention is not limited thereto or thereby. That is, the number of layers forming the structure, and the thickness of the layers may be suitably determined accordingly to the mechanical strength and the slide resistance required for the seal lip depending on the purpose of use of the linear guide.

Figure 4:
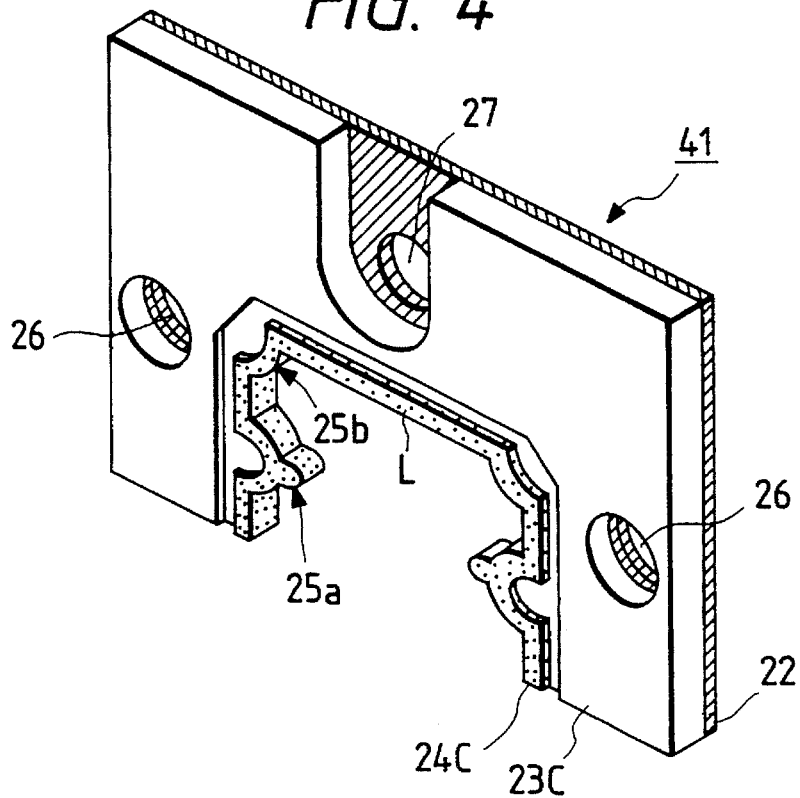
FIG. 4 is a perspective view showing another example of the sealing device, which constitutes a third embodiment of the present invention.

Another example of the side seal, which constitutes a third embodiment of the present invention, is as shown in FIG. 4.

The side seal 41 is formed as follows: First, a U-shaped seal member 23C of rubber or synthetic resin which is relatively large in wall thickness and has a recess between its right and left legs, is prepared. The U-shaped seal member 23C thus prepared is designed to have an inner-peripheral-edge-covered structure. That is, in the U-shaped seal member 23C, the U-shaped peripheral edge of the recess is, in its entirety, covered by a seal member 24C of lubricant-contained rubber or synthetic resin. The resultant seal member 23C is fixedly stuck onto the side seal reinforcing plate 22, to form the side seal 41. In this case, it is preferable that the seal member 24C of lubricant-contained rubber or synthetic resin is soft enough to minimize the slide resistance of the seal lip. The third embodiment is suitably applied to a linear guide which is used for an accurate measuring instrument, not requiring the supply of lubricant so much.

Figure 5:
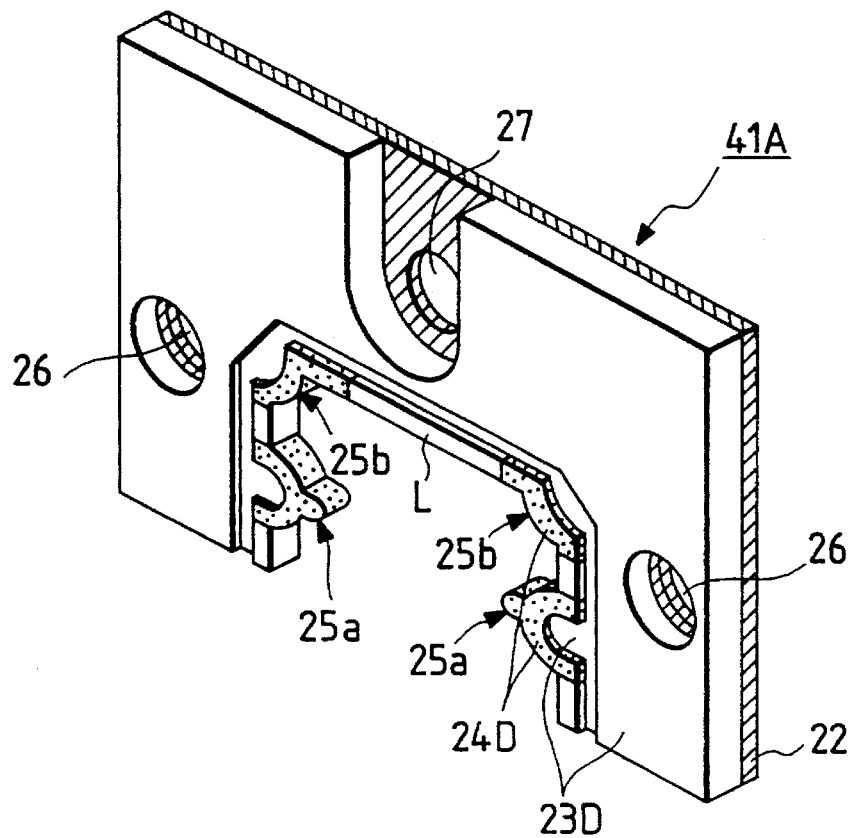
FIG. 5 is a perspective view showing one modification of the sealing device shown in FIG. 4.
Figure 6:
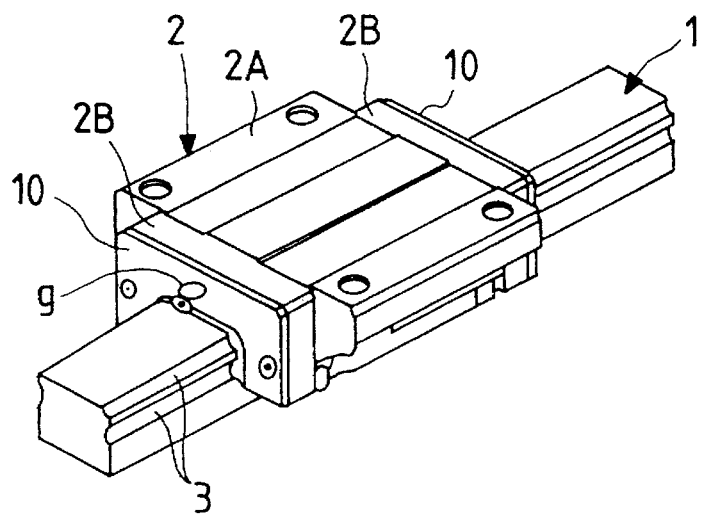
FIG. 6 is a perspective view of a conventional linear guide.
Figure 7:
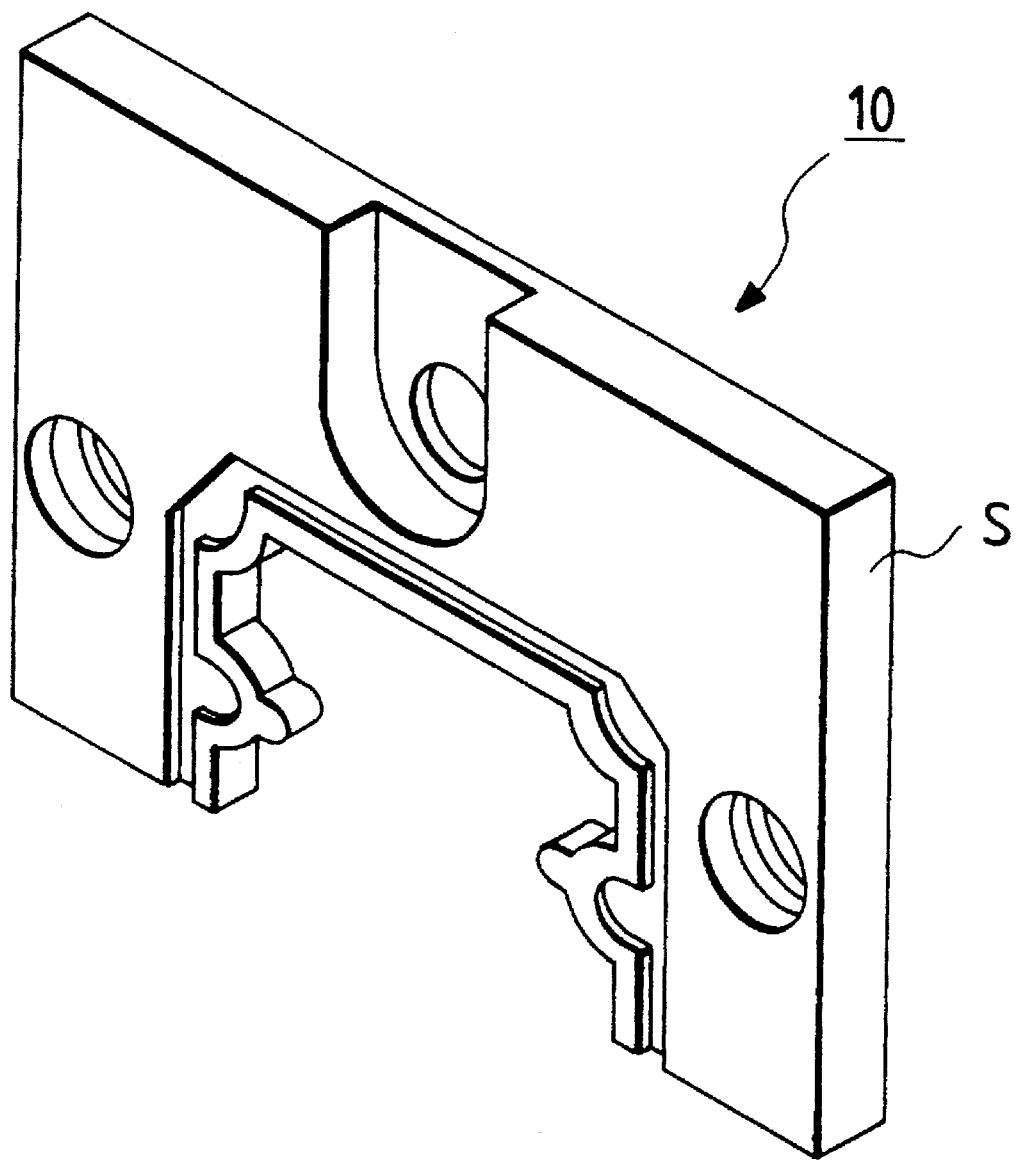
FIG. 7 is a perspective view of a conventional sealing device attached to the linear guide shown in FIG. 6.

One modification of the third embodiment of the present invention is as shown in FIG. 5.

The modification, namely, a side seal 41A is formed as follows: Of the seal lip L of the above-described seal member 23D, only the groove sliding protrusions 25a extended inwardly toward the ball rolling grooves 3 from the right and left legs, and the groove sliding protrusion 25b provided at the corners of the recess are covered with seal members 24D of lubricant-contained rubber or synthetic resin. The resultant seal member 23D is fixedly stuck onto the side seal reinforcing plate 22.

With the modification, the upper and lower ball rolling grooves 3 are in contact with the seal members of lubricant-contained rubber or synthetic resin. However, the modification may be so changed that only the upper or lower ball rolling grooves 3 are in contact with the seal members of lubricant-contained rubber or synthetic resin.

The preferred embodiments of the present invention have been described with reference to the linear guide in which two ball rolling grooves are formed in each of the two sides of the guide rail; however, the present invention is not limited thereto or thereby. That is, the technical concept of the present invention may be equally applied to a linear guide in which one ball rolling groove or more than two ball rolling grooves are formed in each of the two sides of the guide rail. In this case, it goes without saying that the groove sliding protrusions of the side seal are formed according to the ball rolling grooves.

In the above-described embodiments, the balls are employed as the rolling elements; however, the technical concept of the present invention is applicable to a linear guide which employs rollers as rolling elements.

The lubricant to be contained in the seal member 24 of lubricant-contained rubber or synthetic resin may be grease or lubricant.

In each of the sealing devices as shown in FIGS. 1 through 5, it is preferable that the surfaces of the portions of the seal member of lubricant-contained rubber or synthetic resin other than those which are brought into slide contact with the guide rail are covered by coating so that they may not directly contact with the air.

As described above, the sealing device of the present invention provides the layer of rubber of synthetic resin, and the layer of lubricant-contained rubber or synthetic resin which are at least partially laid on and bonded to each other. Hence, it is a so-called "self-lubricating sealing device". That is, the lubricant is automatically supplied to the sliding surfaces oozing gradually from the sealing device. Therefore, even if the linear guide is used in the circumstance that foreign matter such as wooden pieces and casting chips sprinkle over it, it is sufficiently lubricated at all times, and it is smoothly operated with less wear for a long period.

By varying the number of layers of rubber or synthetic resin and the number of layers of lubricant-contained rubber or synthetic resin and the thickness of them, the strength of the seal lip portion can be freely determined according to the purpose of use of the linear guide. That is, designing the sealing device is large in the degree of freedom.

Furthermore, with the sealing device formed by covering the layer of lubricant-contained rubber or synthetic resin with the layer of ordinary rubber or synthetic resin, the lubricant never makes dirty the operator's hands and others. That is, the sealing device can be handled with ease.

The lubrication of the linear guide is achieved merely by attaching the sealing devices of the present invention to the slider. This eliminates the difficult, troublesome operation of applying a minimum quantity of lubricant required for applying the balls to the ball circulating paths in the linear guide with an injector or a special injecting unit.

With the sealing device of the present invention, a necessary quantity of lubricant can be contained in the layer in advance. The lubricant is kept supplied to the ball rolling grooves in the linear guide oozing gradually from the layer of lubricant-contained rubber or synthetic resin. Hence, the lubricant is all effectively utilized. Thus, the linear guide with the sealing device according to the present invention is much longer in service life than the conventional one with the lubricant sealed in the slider when assembled. Hence, even in the circumstance that it is impossible to supplement the lubricant in the linear guide after installation, the linear guide with the sealing devices according to the present invention requires no maintenance for a long time.

What is claimed is:

1. A linear guide comprising:

a guide rail;

a plurality of rolling elements;

a slider linearly moved on said guide rail through said rolling elements; and a sealing device secured to an end of said slider for closing a gap between an inner surface of said slider and an outer surface of said guide rail, wherein said sealing device includes a first layer of a first seal member formed of a material selected from rubber and synthetic resin and a second layer of a second seal member formed of a lubricant-contained material selected from rubber and synthetic resin, said second layer is provided on said first layer, and said sealing device has a seal lip formed in at least said second layer so that said seal lip contacts the outer surface of said guide rail for sealingly closing the gap between the inner surface of said slider and the outer surface of said guide rail.

2. The linear guide of claim 1, wherein said first layer is not porous.

3. The linear guide of claim 1, wherein said sealing device includes at least two first layers so that said sealing device has a three-layer structure formed by holding said second layer between both of said first layers.

4. The linear guide of claim 3, wherein said sealing device has the three-layer structure in only a first portion serving as said seal lip, and said sealing device has a one-layer structure of said first layer in a second portion except said seal lip.

5. The linear guide of claim 1, wherein a first portion of said sealing device serving as said seal lip has a structure so that said first layer is covered by said second layer, and a second portion of said sealing device except said seal lip has a one-layer structure formed of only said first layer.

6. The linear guide of claim 5, wherein said guide rail has a ball rolling groove formed in the outer surface of said guide rail for rolling said rolling elements therein, said seal lip of said sealing device includes a protrusion which is made similar in configuration of the ball rolling groove and extended inwardly toward the ball rolling groove, and wherein only the protrusion of the first portion has the structure so that said first layer is covered by said second layer.

7. The linear guide of claim 1, wherein each of said slider and said sealing device is substantially formed in a U-shape in section so as to have a recess with a U-shaped peripheral edge, and an inner edge of the recess of said sealing device serves as said seal lip.

8. The linear guide of claim 1, wherein said guide rail has a ball rolling groove formed in the outer surface of said guide rail for rolling said rolling elements therein, said seal lip of said sealing device includes a protrusion which is made similar in configuration of the ball rolling groove and extended inwardly toward the ball rolling groove.

9. The linear guide of claim 1, wherein said sealing device includes a reinforcing plate, and said first layer is stuck onto said reinforcing plate for forming unitedly said sealing device.

* * * * *